Patented Mar. 4, 1924.

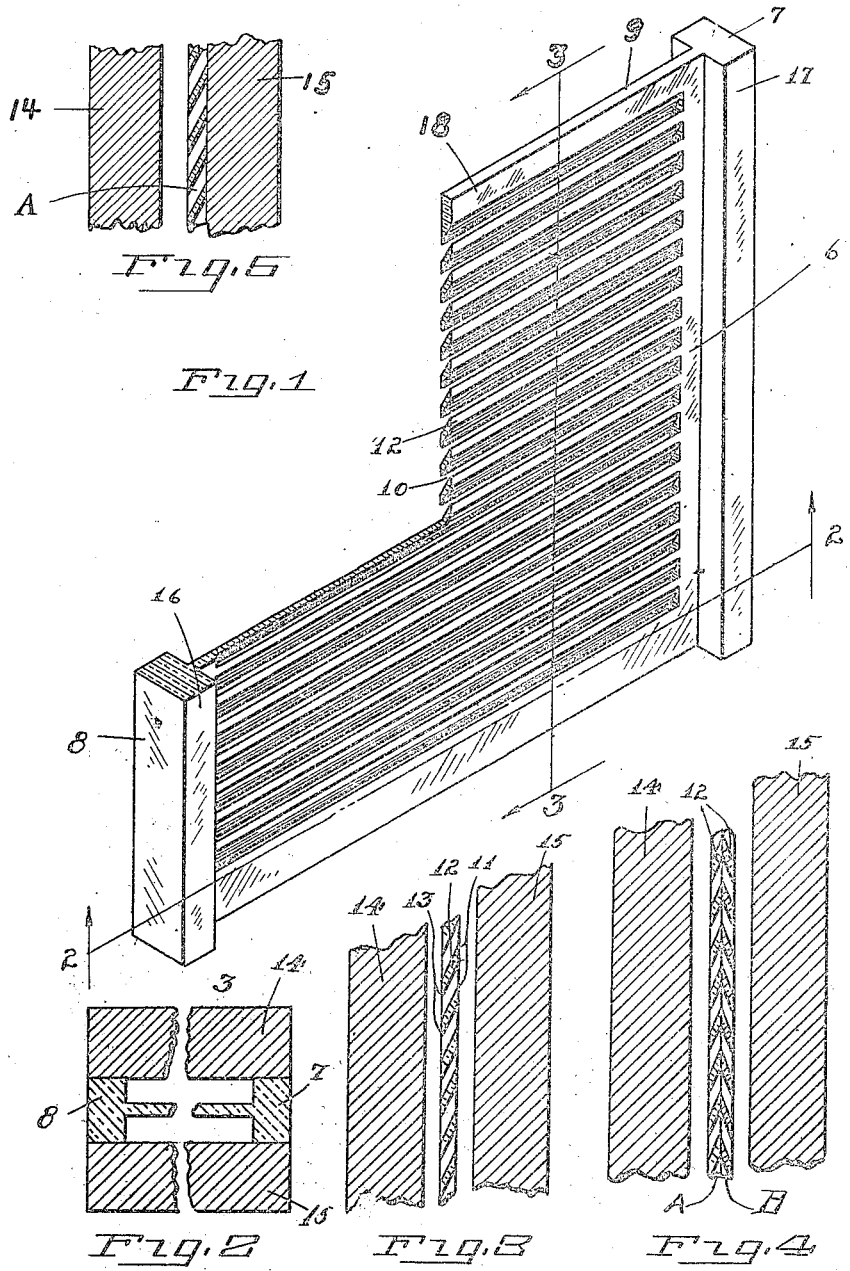

1,485,707

UNITED STATES PATENT OFFICE.

ROY W. PORTMANN, OF NORWOOD, OHIO.

SEPARATOR FOR STORAGE BATTERIES.

Application filed July 5, 1922. Serial No. 572,894.

*To all whom it may concern:*

Be it known that I, ROY W. PORTMANN, a citizen of the United States of America, and a resident of Norwood, in the county of Hamilton and State of Ohio, have invented a new and useful Improvement in a Separator for Storage Batteries, of which the following is a specification.

An object of my invention is to provide a storage battery separator which will preclude short circuiting of the plates thru formations which develop on the plates.

Another object of my invention is to provide a separator for the purpose stated which is simple in construction and which can be readily and expeditiously manufactured.

These and other objects are attained by means described herein and disclosed in the accompanying drawings, in which:

Fig. 1 is a perspective view, part in section, of a separator embodying my invention.

Fig. 2 is a fragmental, horizontal, sectional view of a pair of battery plates having disposed between them a separator embodying my invention, taken on line 2—2 of Fig. 1.

Fig. 3 is a sectional view on line 3—3 of Fig. 1.

Fig. 4 is a view similar to Fig. 3 showing a modified application of separators embodying my invention.

Fig. 5 is a view similar to Fig. 3 showing another method in the application of battery plates embodying my invention.

The separator 6 comprises end posts 7 and 8 which are preferably formed integral with the intermediate portion 9 of the separator.

The separator may be made of any material commonly employed in manufacturing separators for this purpose. The intermediate or body portion 9 of the separator has formed in it transverse inclined slots 10. The walls of the inclined slots are preferably parallel, and the angle of inclination is such that a perpendicular line cannot be drawn from one face of the separator to the other face of the separator without passing thru or touching some part of the separator. In other words the upper edge 11, of each of the ribs 12, is disposed above the lower edge 13 of the next adjacent rib 12. The posts 7 and 8 may be employed to space the battery plates 14 and 15.

In Fig. 4 is shown a structure wherein the posts 7 and 8 have their side faces 16 and 17 flush with the side face 18 of the body portion 9 of the separator. Two separators are then disposed in such relation to one another that the flush face of the post 7 will engage the flush face of the post 8, and vice versa, whereupon the ribs of the two separators will assume the relation shown by the ribs 12 of the separators A and B shown in Fig. 4.

In Fig. 5, one of the separators as is used in Fig. 4, is used singly with the battery plates 14 and 15.

It should be observed that the posts, the ribs, and the body portion of the separator are formed integral, wherefore a minimum of labor and effort is required to produce said separators. Separators made as disclosed herein, are sufficiently rigid and sufficiently flexible to give the most efficient service, the flexibility permitting the separator to give rather than to break, and the rigidity thereof serving to retain the parts in their original and proper relations.

What I claim is:

1. A separator of the class described comprising a frame carrying integral spaced ribs forming unobstructed inclined passages therethru, the ribs having inclined walls, the inclination thereof being such that no perpendicular line can be drawn between the side faces of the separator without contacting some portion of the separator.

2. A separator of the class described comprising a frame carrying integral spaced ribs forming unobstructed inclined passages therethru, the walls of the passages being inclined to such extent that the edges of the ribs on one side of the separator will overlap the edges formed on the next adjacent ribs and disposed on the opposite face of the separator.

In testimony whereof, I have hereunto subscribed my name this 29th day of June, 1922.

ROY W. PORTMANN.